United States Patent [19]

Svoboda

[11] Patent Number: 5,697,086
[45] Date of Patent: Dec. 9, 1997

[54] CO-CHANNEL FM SIGNAL/INTERFERENCE CANCELLER

[75] Inventor: Esteban O. Svoboda, San Jose, Calif.

[73] Assignee: GTE Government Systems Corporation, Del.

[21] Appl. No.: 228,060

[22] Filed: Apr. 15, 1994

[51] Int. Cl.⁶ .................................................. H04B 1/10
[52] U.S. Cl. ........................ 455/304; 455/206; 455/260; 329/336; 329/316; 329/325
[58] Field of Search .............................. 455/304, 302, 455/303, 305, 306, 206, 260, 126, 214; 329/336, 327, 316, 320, 325

[56] References Cited

U.S. PATENT DOCUMENTS

| | | | |
|---|---|---|---|
| 3,199,028 | 8/1965 | Molin et al. | 455/126 X |
| 3,753,123 | 8/1973 | Carpenter et al. | 455/304 |
| 4,859,958 | 8/1989 | Myers | 455/206 X |
| 4,992,747 | 2/1991 | Myers | 455/206 X |
| 5,038,115 | 8/1991 | Myers et al. | 455/260 X |

*Primary Examiner*—Reinhard J. Eisenzopf
*Assistant Examiner*—Philip J. Sobutka
*Attorney, Agent, or Firm*—James J. Cannon, Jr.; J. Stephen Yeo

[57] ABSTRACT

A combination of two phase-lock loops, and a cancellation circuit are used to remove a dominant FM signal from within a signal environment. The two phase-lock loops together produce a replica of the highest power (i.e. dominant) FM signal. The cancellation circuit uses this replica in a demodulation, notch-filtering, and remodulation process to excise the dominant FM signal, leaving the other signal(s) undisturbed. Potential applications include co-channel FM signal/interference cancellation and optimizing utilization of RF spectrum.

1 Claim, 3 Drawing Sheets ns 5,697,086

CO-CHANNEL FM SIGNAL/INTERFERENCE CANCELLER

BACKGROUND OF THE INVENTION

1. Field of the Invention

This invention relates to radio signals and systems intended for removing the effects of co-channel FM signals and/or interference, or for increasing RF spectrum utilization.

2. Description of the Prior Art

The most relevant prior art for this invention are the disclosures of Myers et al. for which U.S. Pat. Nos. 4,859,958, 4,992,747 and 5,038,115 issued on Aug. 22, 1988, Feb. 12, 1991 and Aug. 6, 1991, respectively. In the last Myers et al. U.S. Pat. No. 5,038,115, two phase-lock loops were used to generate a 180° phase-shifted (i.e. inverted) replica of the dominant FM signal within a set of input signals, and this signal replica was subsequently added to the original set of signals to cancel out the dominant signal.

There are three practical problems associated with the last invention of Myers et al. First, the replica of the dominant signal produced by the two phase-lock loops will generally not match the original dominant signal with very high fidelity. Second, the additive cancellation process employed becomes ineffective when there are significant amplitude variations in the received dominant signal due to effects such as multipath and Rayleigh fading. Third, performance is adversely affected by phase shifts of the dominant signal replica that may result from DC drift in PLL components. The current invention solves these problems by improving upon the last invention of Myers et al. in three important ways, as disclosed herein.

The principal object of this invention is to provide an improved demodulator to excise a dominant FM signal, leaving the other signal(s) occupying the same frequency band undisturbed.

It is a further object of this invention to provide a novel combination of two phase-lock loops, and a cancellation circuit to separately demodulate multiple co-channel FM signals at different power levels.

SUMMARY OF THE INVENTION

The invention utilizes an FM demodulation means for recovering the modulating signal of a received dominant FM carrier signal, and an FM modulation means, using said modulating signal as input, for generating a replica of a received dominant FM carrier signal. A delay is provided for aligning in time the original signal input to the replica of the dominant FM signal. A cancellation circuit is provided for removing the dominant FM signal from the original set of input signals.

In a further aspect of the invention, the FM modulator includes a phase-lock loop with loop-bandwidth much narrower than the bandwidth of the signal modulating the dominant FM carrier and having as its VCO input the sum of its loop-filter output and the modulating signal of the dominant FM carrier.

In a still further aspect of the invention, the cancellation circuit includes a means for demodulating said dominant FM signal to a single spectral line at zero-frequency; a filter to notch out said spectral line, leaving the cross-products of all the original underlying signals and the complex-conjugate of the dominant FM signal; and a circuit to multiply said cross-products with the dominant FM signal to obtain a signal which contains all the original underlying signals without the dominant FM signal present.

DETAILED DESCRIPTION OF THE PREFERRED EMBODIMENT

Figure 1:
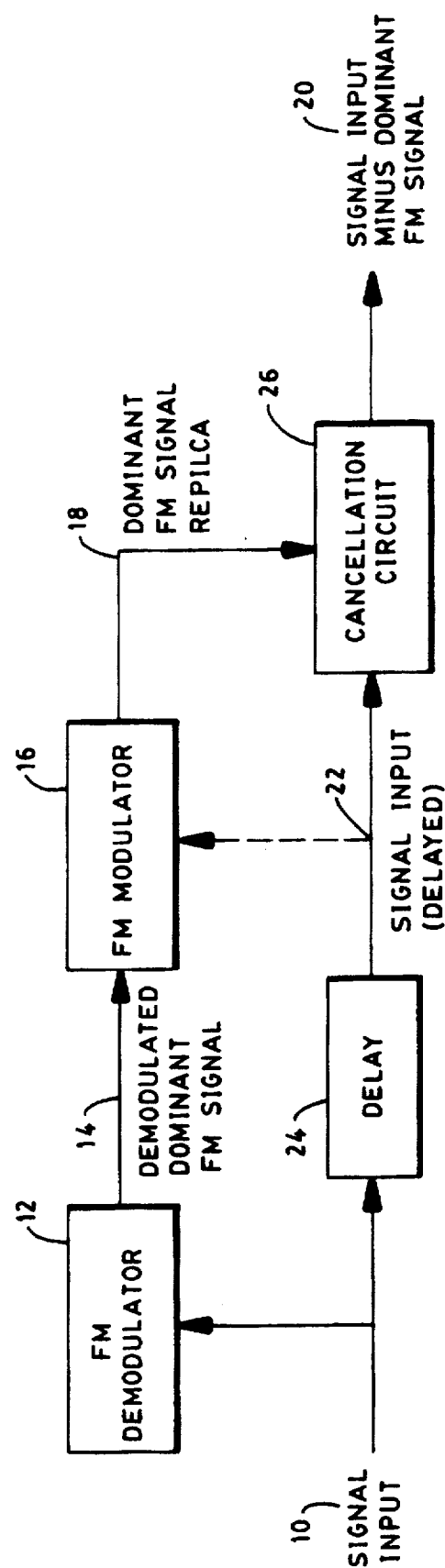
FIG. 1 is block diagram illustrating the basic concept underlying the invention.

FIG. 1 illustrates the basic concept underlying the invention. The signal input 10 comprises a dominant FM signal along with any number of underlying signals. The underlying signals can be FM or some other modulation type. The FM demodulator 12 is captured by the dominant FM signal, and demodulates it. The demodulated signal 14 is then fed into an FM modulator 16 which uses demodulated signal 14 along with a delayed version of the signal input 22 to generate a high-fidelity replica 18 of the dominant FM signal within the signal input 10. In cancellation circuit 26, the replica 18 is used to remove the dominant signal from the delayed signal input 22, leaving the underlying signal(s) 20 intact. The purpose of the delay 24 is to compensate for the time delay incurred in the FM demodulation process.

Figure 2:
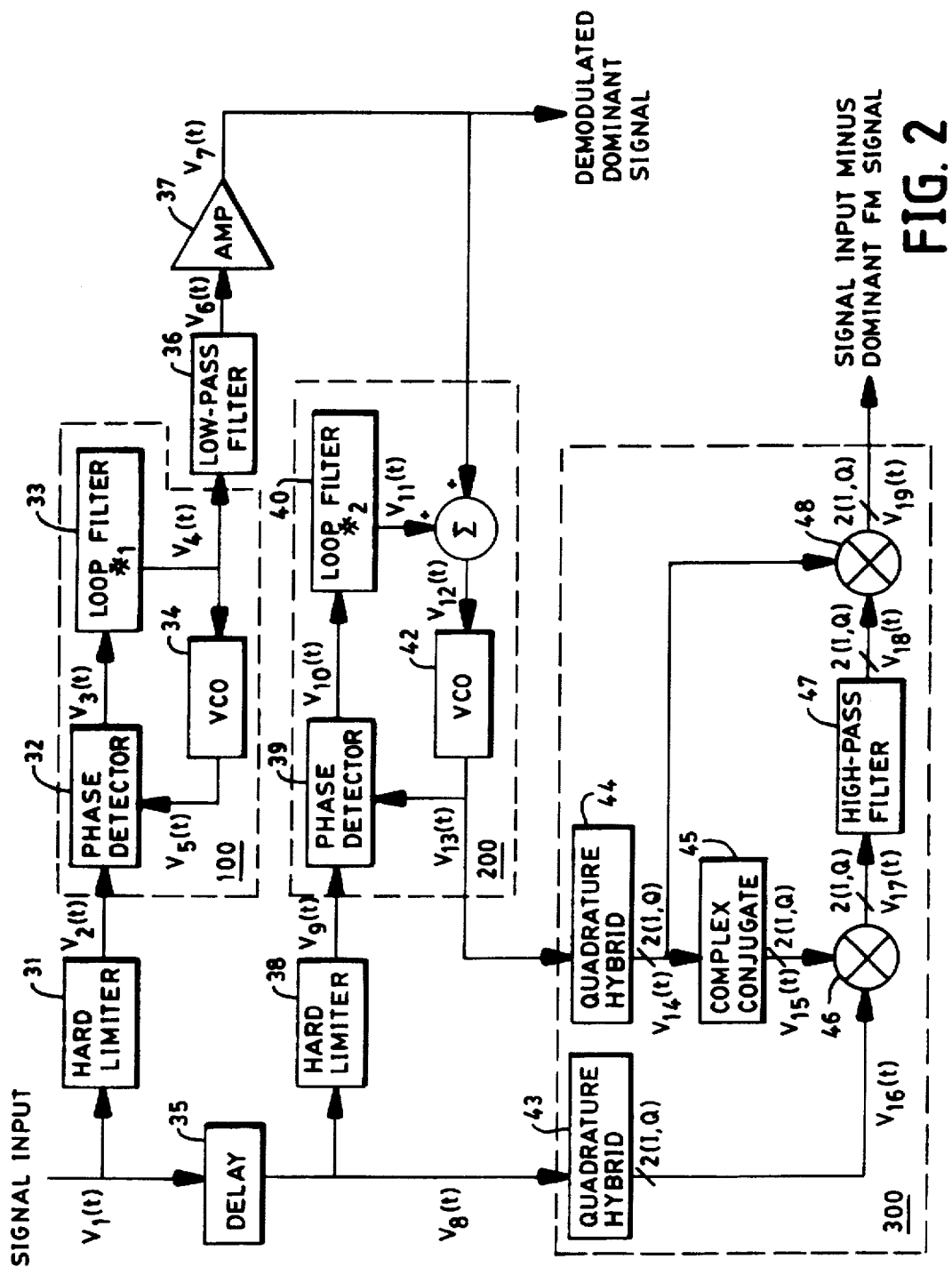
FIG. 2 is a detailed functional block diagram of the preferred embodiment of the invention.

In the present invention as shown in FIG. 2, FM demodulation is performed by phase-lock loop 100. FM modulation is performed by phase-lock loop 200. The cancellation process is performed by cancellation circuit 300.

FIG. 2 illustrates the preferred embodiment of the invention comprising hard limiters 31 and 38, delay 35, low-pass filter 36, amplifier 37, phase-lock loops 100 and 200, and cancellation circuit 300. All of these devices could be implemented in analog hardware, digital hardware, DSP (Digital Signal Processing) software, or a combination of all three. For this reason, the following detailed description will focus upon the function of each element within the invention, rather than on the implementation.

Hard limiters 31 and 38 are for the purpose of enhancing the tracking performance of phase-lock loops 100 and 200. Specifically, they improve phase-detector performance by removing all amplitude variations in the input.

Phase-lock loop (PLL) 100 performs FM demodulation of the dominant FM signal. It comprises phase detector 32, loop filter 33, and VCO 34. The input is $V_2(t)$ containing the hard-limited dominant FM signal and underlying signal(s). The output is $V_4(t)$, containing the modulating signal driving the VCO. The design of PLL 100 is standard and can be realized with commercially available off-the-shelf components. However, performance is enhanced significantly by employing a wide-band type III loop (i.e. loop bandwidth greater than the RF bandwidth of the dominant FM signal, and loop filter containing two ideal integrators). To enhance performance further in certain applications, compensators could be designed into the loop as well.

Low-pass filter 36 averages $V_4(t)$ over time to produce $V_6(t)$, which is then amplified by amplifier 37 to create a clean replica of the signal modulating the dominant FM carrier signal. The averaging performed by the low-pass filter enhances the FM capture effect by removing the interference of the underlying signals upon the dominant FM signal. The gain of amplifier 37 should be set such that the voltage-frequency conversion gain from $V_4(t)$ to $V_{13}(t)$ is the same as that from $V_4(t)$ to $V_5(t)$.

Delay 35 compensates for the time delay through low-pass filter 36, and is set to that value. In practice this delay may be on the order of hundreds of microseconds, and would thus be difficult to implement at high carrier frequencies using analog circuitry. The preferred implementation employs an analog-digital approach, where $V_1(t)$ is A/D converted, clocked into a FIFO buffer, and then D/A converted to form $V_8(t)$. The length of the buffer (and clock rate) determines the length of the delay. This implementation allows one to realize delays of several hundred microseconds with better than 100 nanosecond resolution. It is suitable for both analog and digital implementations of the invention.

PLL 200 creates a replica of the dominant FM signal present in $V_8(t)$. It comprises phase detector 39, loop filter 40, combiner 41, and VCO 42. The input is $V_9(t)$ containing the dominant FM signal and underlying signal(s) hard-limited and delayed in time. The output is $V_{13}(t)$, the output of the VCO 42. The design of the PLL 200 is standard and can be realized with commercially available off-the-shelf components. However, for good performance it is critical that loop filter 40 be designed such that the overall loop bandwidth is very narrow (i.e. less than one-tenth the bandwidth of the signal modulating the dominant FM carrier). The narrow loop bandwidth of PLL 200 thus ensures that the average frequency of VCO output $V_{13}(t)$ is precisely equal to the average frequency of the dominant FM signal in $V_9(t)$. Adding $V_7(t)$ to the VCO input ensures that the instantaneous frequency of $V_{13}(t)$ equals that of the dominant FM signal in $V_9(t)$. The result is that the PLL 200 output, $V_{13}(t)$, is matched in frequency to the dominant FM signal in $V_8(t)$ and $V_9(t)$.

Cancellation circuit 300 comprises quadrature hybrids 43 and 44, complex-conjugation circuit 45, complex mixers 46 and 48, and complex high-pass filter 47. All of these functional elements can be implemented in analog circuitry with commercially available off-the-shelf parts, or using Digital Signal Processing (DSP), or a combination of the two.

The inputs to the cancellation circuit are $V_8(t)$ and $V_{13}(t)$. The former is the original signal input consisting of the dominant FM signal plus underlying signals, and the latter is a high-fidelity replica of the dominant FM signal in $V_8(t)$. The two inputs are each fed into two separate quadrature hybrids 43, 44 which generate $V_{16}(t)$ and $V_{14}(t)$, complex signal representations of each of the inputs. $V_{15}(t)$ is the complex-conjugate of $V_{14}(t)$, and when it is multiplied with $V_{16}(t)$, the dominant FM signal is demodulated to a single spectral line at zero-frequency, $V_{17}(t)$. The high-pass filter 47 notches out this spectral line to produce $V_{18}(t)$. When $V_{18}(t)$ gets multiplied again (i.e. remodulated) with the dominant FM signal $V_{14}(t)$, the result is $V_{19}(t)$, which contains all the original underlying signal(s) without the dominant FM signal present. The underlying signal(s) can now be demodulated, or if necessary the next highest-power FM signal can be excised the same way the original dominant FM signal was excised by using an additional instance of the present invention connected in cascade.

A mathematical description of the theory underlying the cancellation circuit's operation is given below.

Let the dominant FM signal be denoted by D(t), the replica of the dominant signal be denoted by R(t), and the combination of all the underlying signals be denoted by S(t). The original signal input is D(t)+S(t). Using complex exponentials, these signals can be represented as follows:

$$D(t)=|D|_e+(j\omega_D t+\phi)$$

$$S(t)=|S|_e+(j\omega_S t+\alpha)$$

$$R(t)=|R|_e+(j\omega_R t+\theta)$$

Note that if R(t), is a high-fidelity replica of D(t), then $\omega_R=\omega_D$. Thus, the first multiplication within the cancellation circuit gives:

$$[D(t)+S(t)] \cdot R^*(t) = [|D|e^{+(j\omega_D t+\phi)} + |S|e^{+(j\omega_S t+\alpha)}] \cdot |R|e^{-(j\omega_R t+\theta)} \quad (1)$$

$$= |D||R|e^{+(\phi-\theta)} + |S||R|e^{+(j\omega_S t+\alpha)}e^{-(j\omega_R t+\theta)}$$

High-pass filtering (1) yields: $= |S||R|e^{+(j\omega_S t+\alpha)}e^{-(j\omega_R t+\theta)} \quad (2)$ Multiplying (2) with the replica of the dominant FM signal, R(t), produces:

$$|S||R|e^{+(j\omega_S t+\alpha)}e^{-(j\omega_R t+\theta)} \cdot |R|e^{+(j\omega_R t+\theta)} = |S||R|^2 e^{+(j\omega_S t+\alpha)} \quad (3)$$

Note that the dominant FM signal D(t), and the replica R(t) need not have equal magnitude nor equal phase (i.e. |D| need not equal |R|, and $\phi$ need not equal $\theta$).

Complex representation of signals in the cancellation circuit as described above enables multiplication of signals without concern for spectral image-rejection. This is because the frequency spectra of complex signals are single-sided, and thus no spectral images are generated during the multiplication process. However, with proper design, complex representation of signals is not required.

Figure 3:
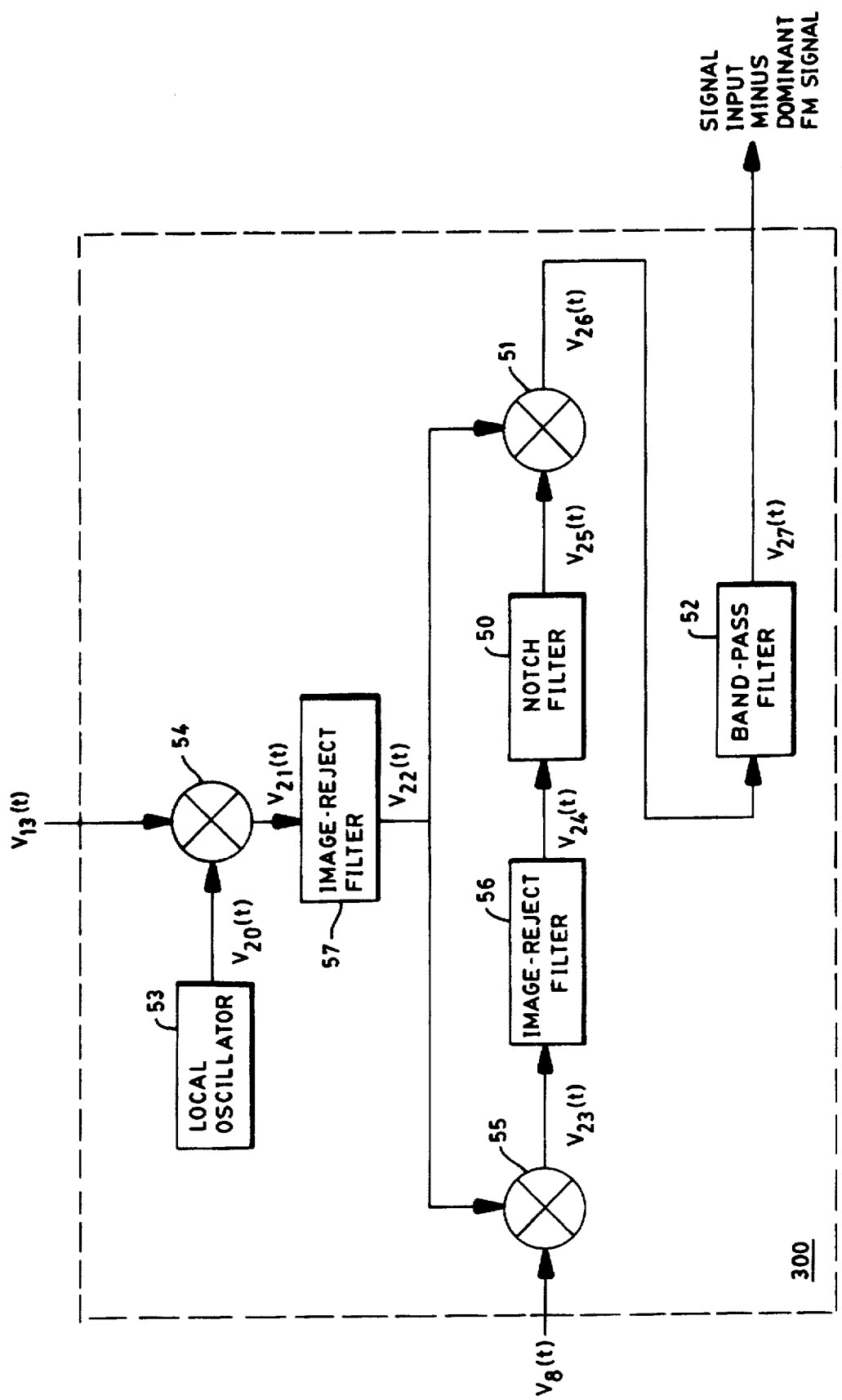
FIG. 3 is a detailed functional block diagram of an alternative embodiment of the cancellation circuit of the invention.

An alternative embodiment of the cancellation circuit 300, shown in FIG. 3, uses conventional mixers 51, 54, 55 with only real (as opposed to complex) inputs. The high-pass filter 47 of the preferred embodiment is replaced by a notch-filter 50 centered at the frequency of a local oscillator 53. Both the embodiments perform essentially the same function. Whereas the preferred embodiment demodulates the dominant FM signal to a single spectral line at zero-frequency before notching, the alternative embodiment described demodulates the dominant FM signal to a single spectral line at another particular frequency before notching. To obtain good performance with the alternative embodiment, one must exercise care in choosing the local oscillator frequency to avoid interference from spectral images. In either case, the notch should be made as narrow as possible.

The present invention solves the problems mentioned of the prior art by improving upon the invention(s) of Myers et al. in three important ways:

First, in this invention, the cancellation method employs a demodulation, notch-filtering, and remodulation process. The benefit of this method is that it does not require amplitude matching of the received dominant FM signal to the locally generated dominant FM signal replica. This cancellation method permits a fixed phase and/or small frequency offset between the received dominant FM signal and the replica as well.

Second, in Myers et at. U.S. Pat. No. 5,038,115, the primary function of the second phase-lock loop was to filter the output of the first phase-lock loop's VCO and add an additional 90° phase-shift in order to generate a 180° phase-shifted replica of the received dominant FM signal. In this invention, the second phase-lock loop 200 instead functions as an FM modulator. Namely, its purpose is to produce a high-fidelity replica (delayed in time) of the received dominant FM signal by using the output from the first phase-lock loop 100 as a modulating signal. The benefit of this is that it takes greater advantage of the FM capture-effect than the Myers et al. design, enabling generation of a very high-fidelity replica of the received dominant FM signal.

Third, the addition of a delay 35 to the inputs to the second phase-lock loop 200 and cancellation circuit 300 compensates for the delay through the low-pass filter 36 at the output from the first phase-lock loop 100. This delay is critical for ensuring that the second phase-lock loop 200 produces a high-fidelity replica of the received dominant FM signal. In also ensures that the input signals to the cancellation circuit 300 are time-aligned.

What is claimed is:

1. A device for removing a dominant FM signal from within a set of input signals occupying the same frequency band, comprising in combination:

a) FM demodulation means for recovering the modulating signal of a received dominant FM carrier signal;

b) FM modulation means for generating a replica of the received dominant FM carrier signal using the output of said FM demodulation means as the modulating signal;

c) delay means for aligning in time the original signal input to a replica of the dominant FM signal generated by said FM modulation means; and d) cancellation means for removing the dominant FM signal from a set of input signals occupying the same frequency band;

said cancellation means comprising:

means to demodulate said dominant FM signal to a single spectral line;

means to filter out said spectral line to produce the cross-products of the dominant FM signal and underlying signals; and means to multiply said signal cross-products with the dominant FM signal again to obtain a signal which contains all of the original underlying signal or signals without the dominant FM signal present.

* * * * *